US012735921B2

(12) United States Patent
Zhao et al.

(10) Patent No.: US 12,735,921 B2
(45) Date of Patent: Sep. 15, 2026

(54) SELF-ADJUSTING VEHICLE DOOR LOCK CATCH ASSEMBLY AND MOUNTING METHOD THEREFOR, AND VEHICLE

(71) Applicants: Zhejiang ZEEKR Intelligent Technology Co., Ltd., Ningbo (CN); Zhejiang Geely Holding Group Co., Ltd., Hangzhou (CN)

(72) Inventors: Xiaonan Zhao, Ningbo (CN); Lingjie Xu, Ningbo (CN); Duo Li, Ningbo (CN); Zhigao Niu, Ningbo (CN); Xiaoyuan Jiang, Ningbo (CN); Dacheng Yang, Ningbo (CN)

(73) Assignees: Zhejiang ZEEKR Intelligent Technology Co., Ltd., Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 0 days.

(21) Appl. No.: 18/971,011

(22) Filed: Dec. 6, 2024

(65) Prior Publication Data

US 2025/0101777 A1 Mar. 27, 2025

Related U.S. Application Data

(63) Continuation of application No. PCT/CN2023/096794, filed on May 29, 2023.

(30) Foreign Application Priority Data

Jun. 7, 2022 (CN) ......................... 202210639465.6

(51) Int. Cl.

| | |
|---|---|
| ***E05B 85/04*** | (2014.01) |
| ***E05B 15/02*** | (2006.01) |
| ***E05B 79/08*** | (2014.01) |

(52) U.S. Cl.
CPC .............. *E05B 85/04* (2013.01); *E05B 79/08* (2013.01); *E05B 2015/027* (2013.01)

(58) Field of Classification Search
CPC ....... E05B 2015/0275; E05B 2015/027; E05B 15/0225; E05B 15/021; E05B 15/022;
(Continued)

(56) References Cited

U.S. PATENT DOCUMENTS 6,666,487 B2 * 12/2003 Oxley ..................... E05B 81/22 292/144
6,715,808 B2 * 4/2004 Oxley ..................... E05B 81/22 292/144

(Continued)

FOREIGN PATENT DOCUMENTS

CN 203201253 U 9/2013
CN 203361789 U 12/2013

(Continued)

OTHER PUBLICATIONS

Extended European Search Report and Written Opinion in related European Application No. 23818963.3 dated Jul. 14, 2025 (14 pages).

(Continued)

*Primary Examiner* — Christine M Mills
*Assistant Examiner* — Faria F Ahmad
(74) *Attorney, Agent, or Firm* — Bayes PLLC

(57) ABSTRACT

A self-adjusting vehicle door lock catch assembly includes: a lock catch body, which includes a base and a lock cylinder, where the base is provided with a bolt through-hole, a first surface of the base is provided with a slide groove, and the lock cylinder is fixedly connected to the first surface of the base; a floating adjustment piece, which is provided in the slide groove, where the floating adjustment piece is provided with an opening, and the bolt through-hole has a diameter
(Continued)

larger than that of the opening of the floating adjustment piece; a fastener, where the diameter of the opening of the floating adjustment piece matches a size of the fastener; and a limit block which is connected to the base, where a limit groove is provided between the limit block and the base, and the limit block limits the lock catch body through the limit groove.

20 Claims, 4 Drawing Sheets

(58) Field of Classification Search
CPC ........ E05B 15/024; E05B 79/02; E05B 79/08; E05B 85/04; E05B 85/045
See application file for complete search history.

(56) References Cited

U.S. PATENT DOCUMENTS

| | | | | |
|---|---|---|---|---|
| 8,944,479 | B2 * | 2/2015 | Muramatsu | E05B 77/36 292/DIG. 3 |
| 12,264,511 | B2 * | 4/2025 | Debroucke | E05B 85/045 |
| 12,503,881 | B2 * | 12/2025 | Stumpp | E05B 15/022 |
| 2012/0112477 | A1 | 5/2012 | Muramatsu et al. | |
| 2013/0180991 | A1 * | 7/2013 | Williams | E05B 85/045 292/341.15 |
| 2014/0008939 | A1 | 1/2014 | Olivieri et al. | |
| 2021/0246687 | A1 * | 8/2021 | Digel | B62D 25/12 |
| 2021/0254367 | A1 * | 8/2021 | Bodechon | E05B 15/022 |
| 2023/0235600 | A1 * | 7/2023 | Debroucke | E05B 85/04 49/394 |

FOREIGN PATENT DOCUMENTS

| | | | |
|---|---|---|---|
| CN | 206522030 | U | 9/2017 |
| CN | 210948108 | U | 7/2020 |
| CN | 111894369 | A | 11/2020 |
| CN | 212054191 | U | 12/2020 |
| CN | 212716254 | U | 3/2021 |
| CN | 213838129 | U | 7/2021 |
| CN | 214196913 | U | 9/2021 |
| CN | 214463376 | U | 10/2021 |
| CN | 115182654 | A | 10/2022 |
| EP | 2017408 | A1 | 1/2009 |
| JP | 2023109723 | A | 8/2023 |

OTHER PUBLICATIONS

International Search Report issued in corresponding International Application No. PCT/CN2023/096794, dated Sep. 16, 2023, 6 pages.
Office Action in related Chinese Application No. 202210639465.6 dated Oct. 10, 2024 (5 pages).
Office Action in related Japanese Application No. 2024-572266 dated Dec. 3, 2025 (9 pages).

* cited by examiner

A-A

B-B

SELF-ADJUSTING VEHICLE DOOR LOCK CATCH ASSEMBLY AND MOUNTING METHOD THEREFOR, AND VEHICLE

CROSS-REFERENCE TO RELATED APPLICATIONS

This application is a continuation of International Application No. PCT/CN2023/096794, filed on May 29, 2023, which claims the benefit of priority to Chinese Application No. 202210639465.6, filed on Jun. 7, 2022, both of which are incorporated herein by reference in their entireties.

TECHNICAL FIELD

The present disclosure relates to the field of interior and exterior trim of a vehicle body, and in particular to a self-adjusting vehicle door lock catch assembly and mounting method therefor, and a vehicle.

BACKGROUND

With continuous development of the automotive industry, people's requirements for riding comfort of vehicles are becoming more and more stringent, especially the quality of a sound when a vehicle door is closed. A mid-high frequency range of the sound when the vehicle door is closed is an impact sound between a door lock and a lock cylinder, quality of which greatly affects users' subjective feelings. A key factor is the actual relative position between the door lock and the lock cylinder, where adjustment of a vehicle door lock catch is very important. If the adjustment of the vehicle door lock catch is not proper, the quality of opening and closing of the vehicle door will be directly affected.

SUMMARY

The present disclosure provides a self-adjusting vehicle door lock catch assembly including: a lock catch body, including a base and a lock cylinder, where the base is provided with a bolt through-hole, and the base includes a first surface and a second surface opposite each other, the first surface facing a vehicle door and the first surface being provided with a slide groove; and the lock cylinder is fixedly connected to the first surface of the base; a floating adjustment piece, provided in the slide groove and configured to adjust a position of the lock catch body, where the floating adjustment piece is provided with an opening, a diameter of the bolt through-hole being greater than a diameter of the opening of the floating adjustment piece; a fastener, configured to secure the base to a sheet metal member of a vehicle sidewall, where the diameter of the opening of the floating adjustment piece matches a size of the fastener; and a limit block, connected to the base, where a limit groove is provided between the limit block and the base, and the limit block is configured to limit the lock catch body through the limit groove.

Optionally, there are two slide grooves and two bolt through-holes provided in the first surface of the base, where each of the slide grooves is concentrically arranged with a respective bolt through-hole, with a sliding space reserved in the slide groove for the floating adjustment piece.

Optionally, the sliding space includes: a transverse sliding space, in which the floating adjustment piece adjusts a position of the lock catch body in a Y direction, the Y direction being in line with a width direction of a vehicle body; and a longitudinal sliding space, in which the floating adjustment piece adjusts a position of the lock catch body in a Z direction, the Z direction being in line with a height direction of the vehicle body.

Optionally, the fastener includes a countersunk bolt.

Optionally, the self-adjusting door lock catch assembly further includes a bushing, provided in an inner wall of the bolt through-hole.

Optionally, a spacer is provided between the second surface of the base and the sheet metal member of the vehicle sidewall.

Optionally, the self-adjusting door lock catch assembly further includes at least one base bracket for supporting the base in the Z-direction.

Optionally, the self-adjusting door lock catch assembly further includes an exterior trim panel covering the first surface of the base.

In another aspect, the present disclosure further provides a mounting method for the self-adjusting vehicle door lock catch assembly, including: pre-tightening and securing the fastener, which passes through the floating adjustment piece and the bolt through-hole, to the sheet metal member of the vehicle sidewall with a first torque; upon closing a vehicle door at a preset closing speed until a door lock is in a locked state, self-adaptively adjust the limit block, the floating adjustment piece, and the fastener, such that the lock catch body is matched with the vehicle door; tightening the fastener with a second torque, the second torque being greater than the first torque; and removing the limit block and installing the exterior trim panel.

In still another aspect, the present disclosure further provides a vehicle including the self-adjusting vehicle door lock catch assembly as described above.

BRIEF DESCRIPTION OF DRAWINGS

In order to more clearly illustrate the embodiments of the present disclosure, the accompanying drawings to be used in the description of the embodiments will be briefly described below. It will be apparent that the accompanying drawings in the following description only illustrate some of the embodiments of the present disclosure, where the same reference numerals generally represent the same components. For a person of ordinary skill in the art, other drawings can be obtained from these drawings without any creative labor.

Figure 1:
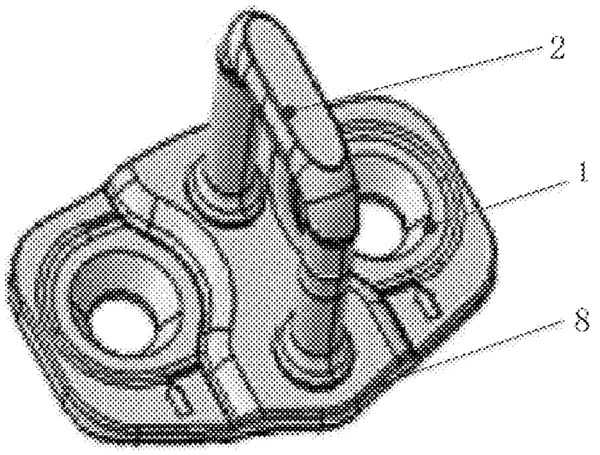
FIG. 1 shows a schematic structural diagram of a vehicle door lock catch in the related art.

Additional description of the accompanying drawings is provided below: 1—base; 2—lock cylinder; 3—bolt through-hole; 4—floating adjustment piece; 5—fastener; 6—limit block; 7—bushing; 8—spacer; 9—base bracket; 10—exterior trim panel.

DETAILED DESCRIPTION

Embodiments of the present disclosure will be clearly and completely described below in conjunction with the accompanying drawings in the embodiments of the present disclosure. It is apparent that the described embodiments are only a part of the embodiments of the present disclosure, and not all of the embodiments. Based on the embodiments in this application, all other embodiments obtained by a person of ordinary skill in the art without making any creative labor fall within the scope of protection of this application.

"An embodiment" or "embodiments" referred to herein indicates a particular feature, structure, or characteristic that may be included in at least one embodiment of the present disclosure. In the description of the present disclosure, it is to be understood that terms "upper", "lower", "top", "bottom", etc., indicate an orientation or positional relationship based on that shown in the accompanying drawings. These terms are intended only to facilitate and simplify the description of the present disclosure, but not indicate or imply that the device or element referred to must have a particular orientation, be constructed and operated in a particular orientation, and therefore are not to be construed as a limitation of the present disclosure. Furthermore, terms "first" and "second" are used only for descriptive purposes, and are not to be construed as indicating or implying relative importance or implicitly specifying the number of technical features indicated. Thus, a feature defined with the terms "first" and "second" may explicitly or implicitly include one or more such feature. Furthermore, the terms "first", "second", etc. are used to distinguish between similar objects and need not be used to describe a particular order or sequence. It should be understood that the terms so used are interchangeable, where appropriate, so that the embodiments of the present disclosure described herein can be implemented in an order other than those illustrated or described herein.

For adjustment of an existing vehicle door lock catch, one person on a left side and another person on a right side of vehicles on a production line are required to make fine adjustments to a door of each vehicle coming off the production line. Due to a limited range of adjustments, and because of requirements of the production takt, it is difficult to ensure that mass-produced vehicles on the entire production line are adjusted to a desired quality of sound when the door is closed.

The self-adjusting vehicle door lock catch assembly according to the present disclosure, is designed with the floating adjustment piece and the limit block, which can automatically calibrate the relative position between the lock catch body and the vehicle door according to an actual position of the vehicle door after the vehicle door is closed, such that the vehicle door and the lock catch body are self-adaptively adjusted to a reasonable state in an up and down direction (Z direction) and a left and right direction (Y direction). The lock catch assembly has strong self-adaptive ability, and relatively wide adjustment range, without excessive auxiliary adjustment structures and equipment, which can not only greatly improve the quality of vehicle door closing, but also save labor costs and time costs, ensure product consistency, and improve production efficiency.

Referring to FIG. 1, FIG. 1 shows a schematic structural diagram of a vehicle door lock catch in the related art. The vehicle door lock catch in the related art generally includes a base 1, a lock cylinder 2, and a spacer 8, and is fixed to a sidewall pillar by two countersunk bolts. During installation, it is necessary to manually check whether a relative position between the lock cylinder and the vehicle door is appropriate.

Figure 2:
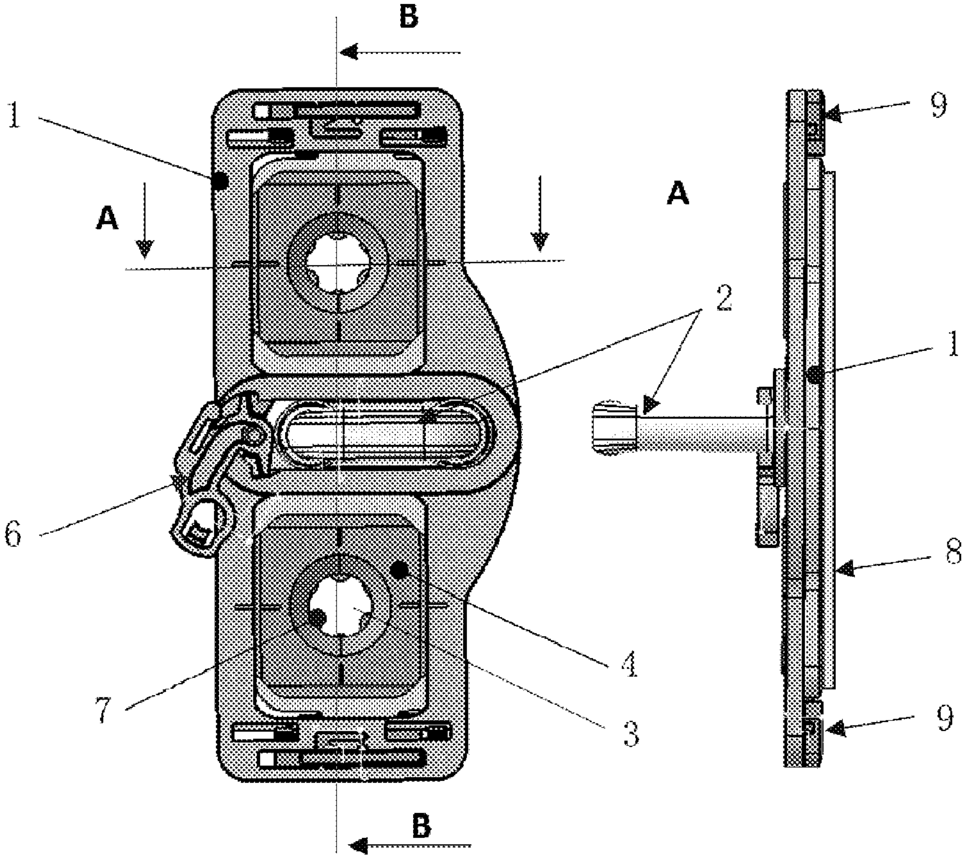
FIG. 2 shows a schematic structural diagram of a self-adjusting vehicle door lock catch assembly according to an embodiment of the present disclosure.
Figure 3:
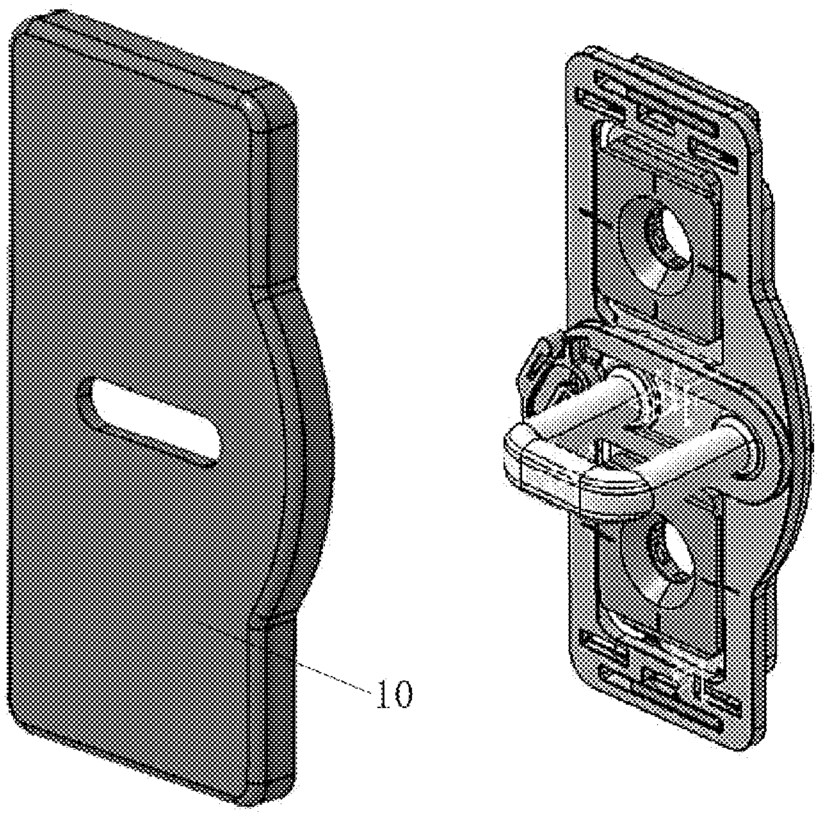
FIG. 3 shows a schematic structural diagram of an exterior trim panel and a lock catch body of a self-adjusting vehicle door lock catch assembly according to an embodiment of the present disclosure.

Referring to FIG. 2 and FIG. 3, embodiments of the present disclosure provide a self-adjusting vehicle door lock catch assembly, including: a lock catch body, including a base 1 and a lock cylinder 2, where the base 1 is provided with a bolt through-hole 3, and the base 1 includes a first surface and a second surface opposite each other, the first surface facing a vehicle door and the first surface being provided with a slide groove; and the lock cylinder 2 is fixedly connected to the first surface of the base 1; a floating adjustment piece 4, provided in the slide groove and configured to adjust a position of the lock catch body, where the floating adjustment piece 4 is provided with an opening, a diameter of the bolt through-hole 3 being greater than a diameter of the opening of the floating adjustment piece 4; a fastener 5, configured to secure the base 1 to a sheet metal member of a vehicle sidewall, where the diameter of the opening of the floating adjustment piece 4 matches a size of the fastener 5; and a limit block 6, connected to the base 1, where a limit groove is provided between the limit block 6 and the base 1, and the limit block 6 is configured to limit the lock catch body through the limit groove.

Material of the base 1 in the embodiment of the present disclosure may include polyoxymethylene (POM). The lock cylinder 2 is provided in the middle of the first surface of the base 1, and faces the vehicle door. In a possible embodiment, two bolt through-holes 3 are provided in the base 1 above and below the lock cylinder 2 in a height direction of a vehicle body, with the lock cylinder 2 as a centerline. The fastener 5 passes through the corresponding bolt through-hole 3 to secure the base 1 to the sheet metal member of the vehicle sidewall. In a possible embodiment, the fastener 5 includes a countersunk bolt. The fastener 5 further includes a nut matching the countersunk bolt, which can be mounted, for example, on a nut plate on an inner side of an inner panel of the sidewall.

During installation of the lock catch assembly, the fastener 5, which passes through the floating adjustment piece 4 and the bolt through-hole 3, is pre-tightened and secured to the sheet metal member of the vehicle sidewall with a first torque. The vehicle door is then closed at a preset closing speed until the door lock is in a locked state. At this time, the limit block 6, the floating adjustment piece 4, and the fastener 5 are self-adaptively adjusted so that the lock catch body is matched with the vehicle door, i.e., the limit block 6, the floating adjustment piece 4, and the fastener 5 are self-adaptively adjusted to a desired position. The fastener 5 is then tightened with a second torque greater than the first torque, and the limit block 6 is removed. In the embodiment of the present disclosure, material of the limit block 6 may include polyamide 66 (PA66).

In a possible embodiment, the first surface of the base 1 is provided with two slide grooves, each of which is concentrically arranged with a respective bolt through-hole 3, and has a sliding space reserved for sliding of the floating adjustment piece 4. The floating adjustment piece 4 is mounted in the corresponding slide groove, a size of the slide groove being larger than a size of the floating adjustment piece 4, to leave space for the floating adjustment piece 4 to slide, so that the floating adjustment piece 4 can be moved up and down, and left and right.

Figure 4:
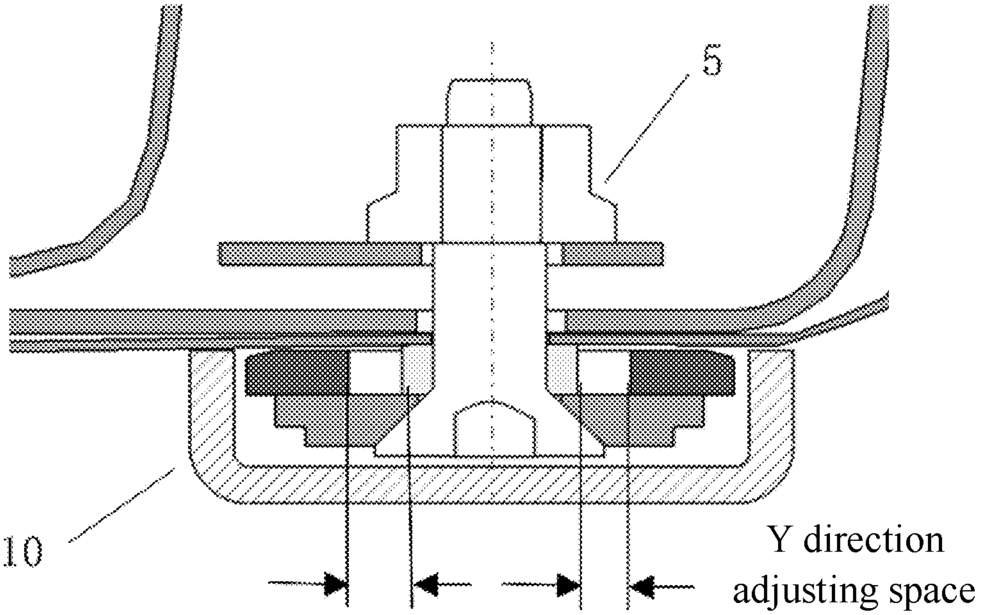
FIG. 4 shows a detailed diagram of an A-A section of a self-adjusting vehicle door lock catch assembly according to an embodiment of the present disclosure.
Figure 5:
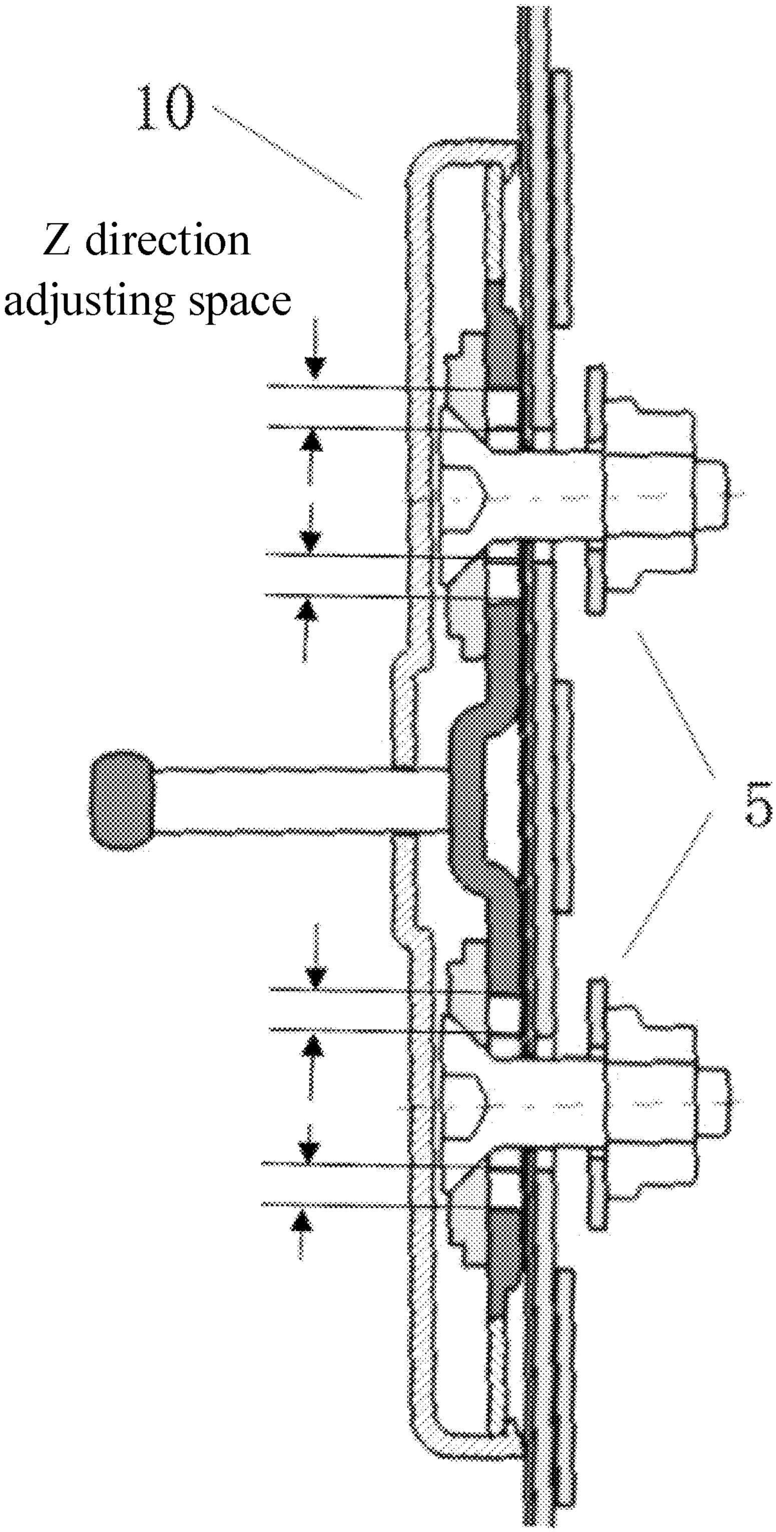
FIG. 5 shows a detailed diagram of a B-B section of a self-adjusting vehicle door lock catch assembly according to an embodiment of the present disclosure.

In a possible embodiment, the sliding space includes: a transverse sliding space, in which the floating adjustment piece 4 adjusts a position of the lock catch body in a Y direction, the Y direction being in line with a width direction of the vehicle body, with reference to details of the A-A section shown in FIG. 4; and a longitudinal sliding space, in which the floating adjustment piece 4 adjusts a position of the lock catch body in a Z direction, the Z direction being in line with a height direction of the vehicle body, with reference to details of the B-B section shown in FIG. 5.

In a possible embodiment, the self-adjusting vehicle door lock catch assembly further includes a bushing 7, provided on an inner wall of the bolt through-hole 3. In particular, the bushing 7 acts as a seal. During installation of the lock catch assembly, the floating adjustment piece 4 is required to adjust the position of the lock catch body. The fastener 5 passes through the floating adjustment piece 4 and the bolt through-hole 3 to fix the lock catch body, where the diameter of the bolt through-hole 3 is larger than the diameter of the opening of the floating adjustment piece 4. When the floating adjustment piece 4 is adaptively adjusted to an appropriate position, the fastener 5 is tightened, and at this time, the bushing 7 cooperates with the space where the floating adjustment piece 4 moves, so that the fastener 5 is fastened to the bolt through-hole 3.

In a possible embodiment, a spacer 8 is provided between the second surface of the base 1 and the sheet metal member of the vehicle sidewall. In a possible embodiment, the self-adjusting vehicle door lock catch assembly further includes at least one base bracket 9 for supporting the base 1 in the Z direction. In the embodiment of the present disclosure, there are two base brackets 9, which are provided at upper and lower ends of the base 1 in the height direction of the vehicle body, so as to secure and support the base 1. Material of the base bracket 9 may include POM.

In a possible embodiment, the self-adjusting vehicle door lock catch assembly further includes an exterior trim panel 10, covering the first surface of the base 1. After the fastener 5 is tightened and the limit block 6 is removed, the exterior trim panel 10 is installed to make the lock catch assembly more aesthetically pleasing.

Figure 6A:
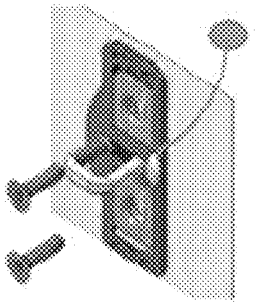
FIGS. 6A-6F show a schematic diagram of a mounting method for a self-adjusting vehicle door lock catch assembly according to an embodiment of the present disclosure.
Figure 6B:
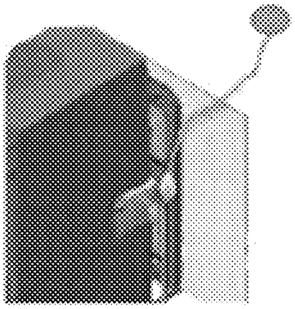
Figure 6C:
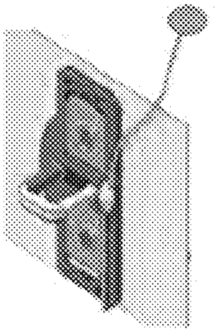
Figure 6D:
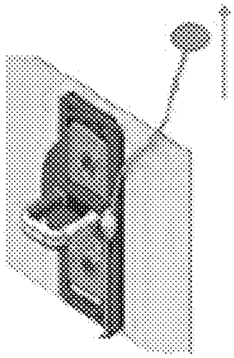
Figure 6E:
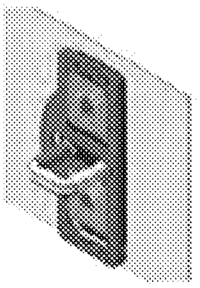
Figure 6F:
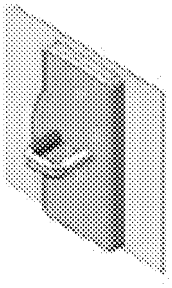

In another aspect, referring to FIGS. 6A-6F, embodiments of the present disclosure further provide a mounting method for the self-adjusting vehicle door lock catch assembly including: pre-tightening and securing the fastener 5, which passes through the floating adjustment piece 4 and the bolt through-hole 3, to the sheet metal member of the vehicle sidewall with a first torque, as shown in FIG. 6A; upon closing the vehicle door at a preset closing speed until a door lock is in a locked state, self-adaptively adjusting the limit block 6, the floating adjustment piece 4, and the fastener 5, such that the lock catch body is matched with the vehicle door, as shown in FIG. 6B; tightening the fastener 5 with a second torque, the second torque being greater than the first torque, as shown in FIG. 6C; and removing the limit block 6 and installing the exterior trim panel 10, as shown in FIGS. 6D-6F.

In another aspect, embodiments of the present disclosure further provide a vehicle including the self-adjusting vehicle door lock catch assembly as described above.

With the self-adjusting vehicle door lock catch assembly and the mounting method therefor, and the vehicle according to the embodiments of the present disclosure, the limit block, the floating adjustment piece, and the fastener automatically calibrate the relative position between the lock catch body and the vehicle door according to an actual position of the vehicle door after the vehicle door is closed, such that the vehicle door and the lock catch body are self-adaptively adjusted to a reasonable state in an up and down direction (Z direction) and a left and right direction (Y direction). The lock catch assembly has strong self-adaptive ability, and relatively wide adjustment range, without excessive auxiliary adjustment structures and equipment, which can not only greatly improve the quality of vehicle door closing, but also save labor costs and time costs, ensure product consistency, and improve production efficiency.

The foregoing are only some embodiments of the present disclosure, and are not intended to limit the present disclosure, and any modifications, equivalent substitutions, improvements, etc. made within the spirit and principles of the present disclosure shall be included in the scope of protection of the present disclosure.

The invention claimed is:

1. A self-adjusting vehicle door lock catch assembly, comprising:

a lock catch body, comprising a base and a lock cylinder, wherein the base comprises a first surface and a second surface opposite each other, the first surface facing a vehicle door and the first surface being provided with a slide groove, the lock cylinder is fixedly connected to the first surface of the base, and the base is provided with a bolt through-hole in the first surface;

a floating adjustment piece, provided in the slide groove and configured to adjust a position of the lock catch body, wherein the floating adjustment piece is provided with an opening, a diameter of the bolt through-hole being greater than a diameter of the opening of the floating adjustment piece;

a fastener, configured to secure the base to a sheet metal member of a vehicle sidewall, wherein the diameter of the opening of the floating adjustment piece matches a size of the fastener; and a limit block, connected to the base, wherein a limit groove is provided between the limit block and the base, and the limit block is configured to limit the lock catch body through the limit groove.

2. The self-adjusting vehicle door lock catch assembly according to claim 1, wherein there are two slide grooves and two bolt through-holes provided in the first surface of the base, and each of the slide grooves is concentrically arranged with a respective bolt through-hole, with a sliding space reserved in the slide groove for the floating adjustment piece.

3. The self-adjusting vehicle door lock catch assembly according to claim 2, wherein the sliding space comprises:

a transverse sliding space, in which the floating adjustment piece adjusts a position of the lock catch body in a Y direction, the Y direction being in line with a width direction of a vehicle body; and a longitudinal sliding space, in which the floating adjustment piece adjusts a position of the lock catch body in a Z direction, the Z direction being in line with a height direction of the vehicle body.

4. The self-adjusting vehicle door lock catch assembly according to claim 1, wherein the fastener comprises a countersunk bolt.

5. The self-adjusting vehicle door lock catch assembly according to claim 1, further comprising a bushing, provided on an inner wall of the bolt through-hole.

6. The self-adjusting vehicle door lock catch assembly according to claim 1, wherein a spacer is provided between the second surface of the base and the sheet metal member of the vehicle sidewall.

7. The self-adjusting vehicle door lock catch assembly according to claim 3, further comprising at least one base bracket for supporting the base in the Z direction.

8. The self-adjusting vehicle door lock catch assembly according to claim 1, further comprising an exterior trim panel covering the first surface of the base.

9. A method for mounting a self-adjusting vehicle door lock catch assembly comprising a lock catch body, a floating adjustment piece, a fastener, and a limit block, the lock catch body comprising a base having a first surface that faces a vehicle door and is provided with a slide groove, the floating adjustment piece being provided in the slide groove, the method comprising:

pre-tightening and securing the fastener that passes through the floating adjustment piece and a bolt through-hole provided in the first surface of the base to a sheet metal member of a vehicle sidewall with a first torque;

upon closing the vehicle door at a preset closing speed until a door lock is in a locked state, self-adaptively adjusting the limit block, the floating adjustment piece, and the fastener, such that the lock catch body is matched with the vehicle door;

tightening the fastener with a second torque, the second torque being greater than the first torque; and removing the limit block and installing an exterior trim panel.

10. The method according to claim 9, wherein a relative position between the lock catch body and the vehicle door is automatically calibrated according to an actual position of the vehicle door after the vehicle door is closed.

11. The method according to claim 9, wherein the vehicle door and the lock catch body are self-adaptively adjusted to a state in an up and down direction and a left and right direction.

12. The method according to claim 9, wherein the floating adjustment piece is provided with an opening, and a diameter of the opening of the floating adjustment piece matches a size of the fastener.

13. A vehicle, comprising a self-adjusting vehicle door lock catch assembly, wherein the self-adjusting vehicle door lock catch assembly comprises:

a lock catch body, comprising a base and a lock cylinder, wherein the base comprises a first surface and a second surface opposite each other, the first surface facing a vehicle door and the first surface being provided with a slide groove, the lock cylinder is fixedly connected to the first surface of the base, and the base is provided with a bolt through-hole in the first surface;

a floating adjustment piece, provided in the slide groove and configured to adjust a position of the lock catch body, wherein the floating adjustment piece is provided with an opening, a diameter of the bolt through-hole being greater than a diameter of the opening of the floating adjustment piece;

a fastener, configured to secure the base to a sheet metal member of a vehicle sidewall, wherein the diameter of the opening of the floating adjustment piece matches a size of the fastener; and a limit block, connected to the base, wherein a limit groove is provided between the limit block and the base, and the limit block is configured to limit the lock catch body through the limit groove.

14. The vehicle according to claim 13, wherein there are two slide grooves and two bolt through-holes provided in the first surface of the base, and each of the slide grooves is concentrically arranged with a respective bolt through-hole, with a sliding space reserved in the slide groove for the floating adjustment piece.

15. The vehicle according to claim 14, wherein the sliding space comprises:

a transverse sliding space, in which the floating adjustment piece adjusts a position of the lock catch body in a Y direction, the Y direction being in line with a width direction of a vehicle body; and a longitudinal sliding space, in which the floating adjustment piece adjusts a position of the lock catch body in a Z direction, the Z direction being in line with a height direction of the vehicle body.

16. The vehicle according to claim 13, wherein the fastener comprises a countersunk bolt.

17. The vehicle according to claim 13, wherein the self-adjusting vehicle door lock catch assembly further comprises a bushing, provided on an inner wall of the bolt through-hole.

18. The vehicle according to claim 13, wherein a spacer is provided between the second surface of the base and the sheet metal member of the vehicle sidewall.

19. The vehicle according to claim 15, wherein the self-adjusting vehicle door lock catch assembly further comprises at least one base bracket for supporting the base in the Z direction.

20. The vehicle according to claim 13, wherein the self-adjusting vehicle door lock catch assembly further comprises an exterior trim panel covering the first surface of the base.

* * * * *